(12) United States Patent
Chen

(10) Patent No.: US 6,596,183 B2
(45) Date of Patent: Jul. 22, 2003

(54) CUTTING-FREE METHOD FOR MAKING A HOLOGRAM STICKER AND THE STRUCTURE OF THE STICKER

(76) Inventor: Teng-Kuei Chen, 11 Fl., No. 63, Lane 122, Jen-Ai Rd., Taipei (TW)

( * ) Notice: Subject to any disclaimer, the term of this patent is extended or adjusted under 35 U.S.C. 154(b) by 21 days.

(21) Appl. No.: 09/854,216

(22) Filed: May 11, 2001

(65) Prior Publication Data

US 2002/0167691 A1 Nov. 14, 2002

(51) Int. Cl.⁷ .............................. G03H 1/00; G03H 1/04
(52) U.S. Cl. .............................. 216/4; 216/24; 216/33; 359/1; 359/35; 428/40.1
(58) Field of Search .............................. 428/40.1; 359/1, 359/35; 216/4, 24, 33

(56) References Cited

U.S. PATENT DOCUMENTS 6,280,553 B1 * 8/2001 Yang ........................ 156/235

* cited by examiner

Primary Examiner—Shrive P. Beck
Assistant Examiner—Allan Olsen
(74) Attorney, Agent, or Firm—Dellett and Walters

(57) ABSTRACT

A cutting-free method for making a hologram sticker includes the steps of adding a releasing layer on a base; plating a metal layer on the releasing layer; printing an epoxy layer with a holographic pattern on the metal layer; chemically etching the metal layer not covered by the epoxy layer together to remove the excess metal layer; washing the residual layers; drying the washed and etched layers; applying an adhesive layer on top of the washed epoxy layer and applying a releasing layer on top of the adhesive layer.

16 Claims, 8 Drawing Sheets

CUTTING-FREE METHOD FOR MAKING A HOLOGRAM STICKER AND THE STRUCTURE OF THE STICKER

BACKGROUND OF THE INVENTION

1. Field of the Invention

The present invention relates to a method for making a hologram sticker, and more particularly to a method that plates a metal layer on a first releasing layer on which a hologram is formed, printing an epoxy layer over the hologram and then chemically etching away the metal layer not covered by the epoxy layer. A layer of adhesive is applied to the epoxy layer. A second releasing layer is applied to the epoxy layer to form a sticker without having to cut the stickers out. The present invention further relates to the structure of a hologram sticker, wherein a plating treatment forms a metal layer on the first releasing layer. A hologram is formed on the metal layer. Thereafter, a layer of epoxy and a layer of adhesive are sequentially printed over the hologram on top of one another and a second releasing layer is applied to the adhesive to thus form a hologram sticker without the necessity of cutting out the stickers.

2. Description of Related Art

Conventional hologram stickers are generally one of two kinds, and both require cutting to release the final sticker product.

With reference to FIG. 8, a first conventional sticker has a substrate (60), a layer of adhesive (61), a releasing layer (62) and a pattern (63). The substrate (60) is made of a sheet of paper or plastic. The layer of adhesive (61) is added on the bottom of the substrate (60). The releasing layer (62) is added on the bottom of the adhesive layer (61) to form a base of the sticker. The pattern (63) is printed on top of the substrate (60) by laser hot stamping. When the foregoing structure is completed, a blade cuts out the pattern (63) along cutting lines (64) around the pattern (63) to release the finished product.

With reference to FIG. 9, a second conventional sticker has a base (70), a plated layer (71), an adhesive layer (72) and a releasing layer (73). The plated layer (71) is directly applied on top of the base (70). The adhesive layer (72) is applied on the bottom of the base (70). The releasing layer (73) removably covers the exposed surface of the adhesive layer (72). When the layered structure is finished, a cutting blade with a particular pattern is applied to the completed layered structure to release the final sticker product along cutting lines (74).

Both of the stickers need a cutting blade to define the pattern of the sticker. Because the blade cannot precisely replicate the pattern, a rough contour is produced when the sticker is cut in either situation, which makes the sticker, when applied, unsightly and messy.

Thus, it is concluded that the conventional sticker cannot achieve the delicate requirement to form a perfect sticker.

In order to accomplish the desired delicate pattern on a sticker without the use of cutting blade, there is a structure introduced in the market to meet the requirement. The structure has a base (80), an adhesive layer (81) applied on a bottom of the base (80), a releasing layer (82) applied immediately to the adhesive layer (81), a plated layer (83) formed on a top of the base (80) and an oily paint layer (84) printed on a top of the plated layer (83) and having a specific pattern. Thereafter, the plated layer (83) with no oily paint layer (84) covered is removed by etching with an alkaline solution. When the sticker of this type is in use, firstly the releasing layer (82) is removed and the base (80) together with the plated layer (83) and the oily paint layer (84) are applied as a whole. It is to be noted that when the sticker is applied onto a surface, the entirety of the base (80) is also applied on the surface, which can not meet the requirement of delicacy in the sticker.

To overcome the shortcomings, the present invention intends to provide a cutting-free method and an improved structure of a hologram sticker to mitigate and obviate the aforementioned problems.

SUMMARY OF THE INVENTION

The main objective of the invention is to provide a cutting-free method for making a hologram sticker, which includes the steps of adding a releasing layer on a base layer; plating a metal layer on the releasing layer; printing an epoxy layer with a pattern on top of the metal layer; chemically etching the plated metal layer to remove the excess metal layer not covered by the epoxy layer; washing the residual layers; drying the washed and etched layers; applying an adhesive layer on top of the washed epoxy layer and applying a releasing layer on top of the adhesive layer.

Another objective of the invention is to provide an improved sticker structure including a base, a first releasing layer, a plating layer, an epoxy layer, an adhesive layer and a second releasing layer.

Other objects, advantages and novel features of the invention will become more apparent from the following detailed description when taken in conjunction with the accompanying drawings.

DETAILED DESCRIPTION OF PREFERRED EMBODIMENT

Figure 1:
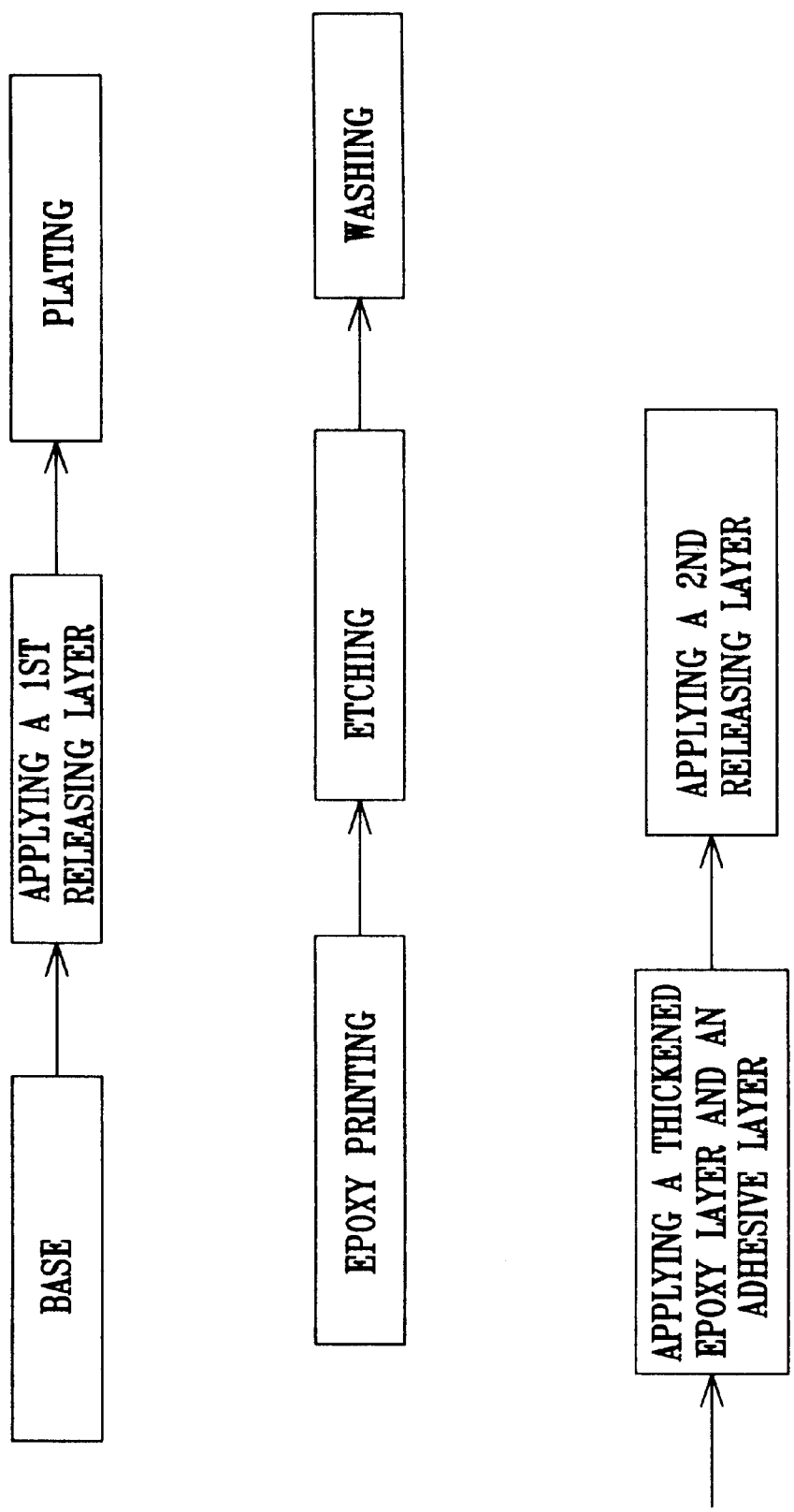
FIG. 1 is a flow chart showing the steps of the cutting-free method for making a hologram sticker in accordance with the present invention.
Figure 2:
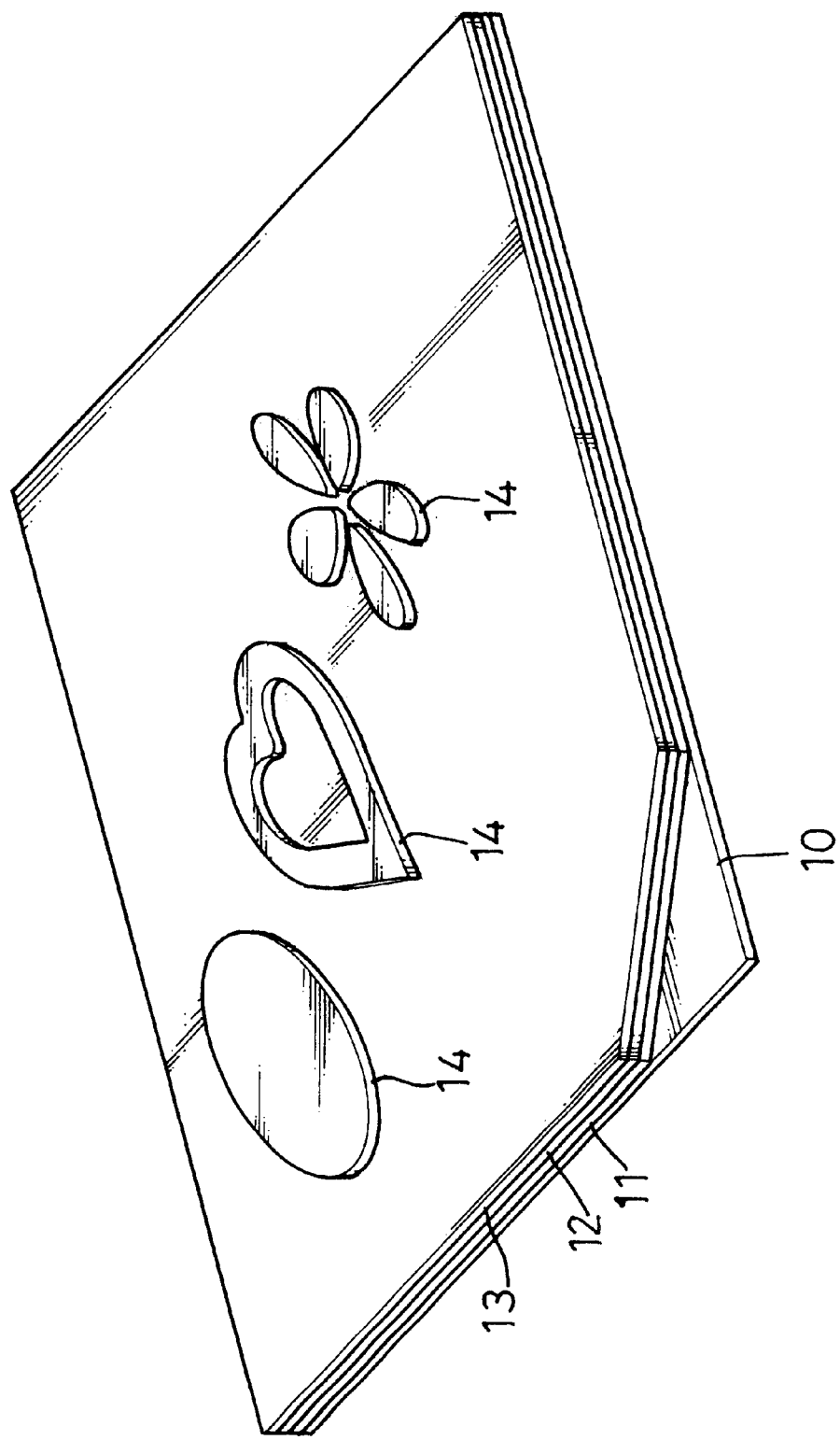
FIG. 2 is a perspective view of the structure of a sticker before the etching step in accordance with the present invention.
Figure 3:
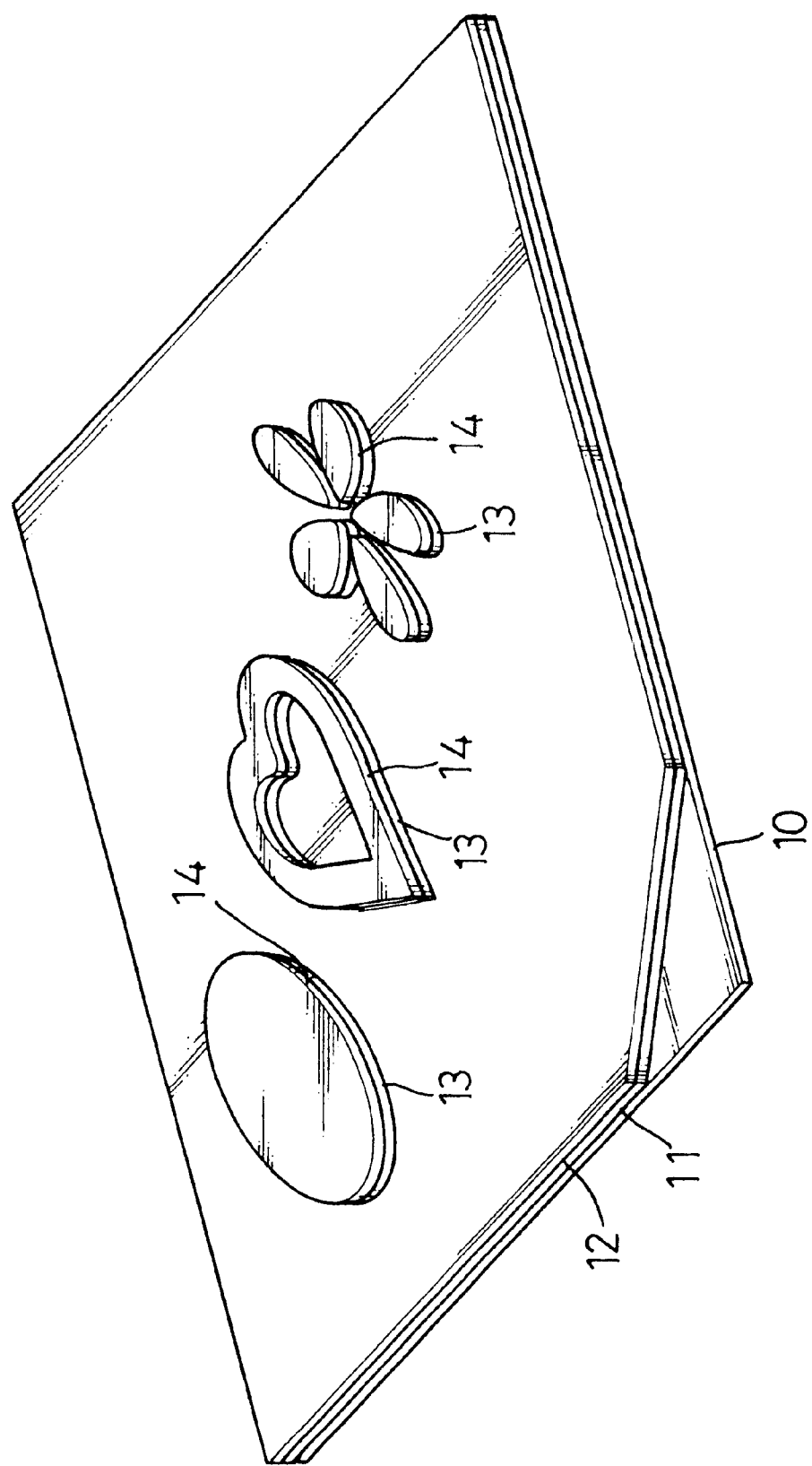
FIG. 3 is a perspective view of the structure of the sticker after the etching step in accordance with the present invention.
Figure 4:
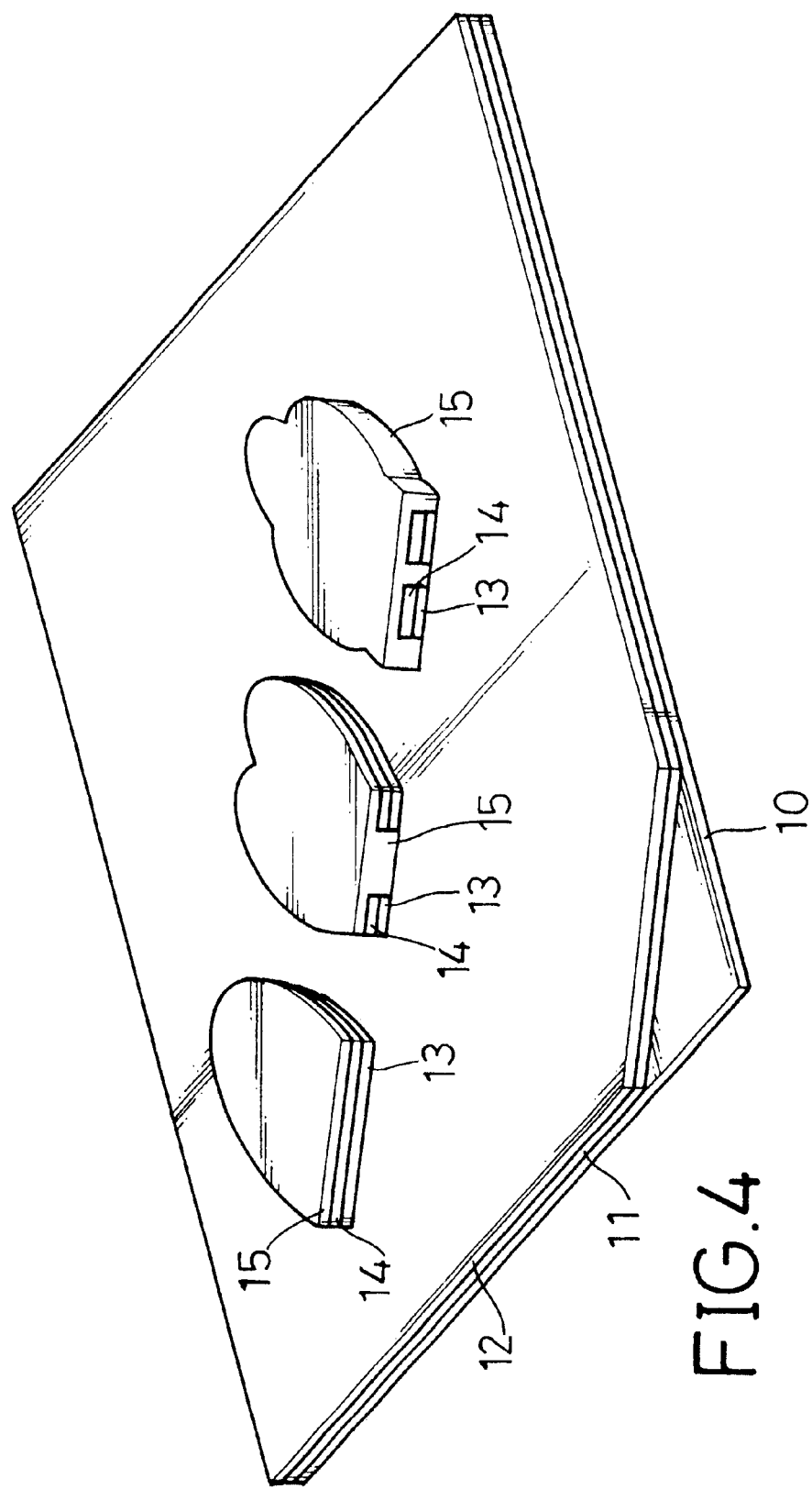
FIG. 4 is a perspective view of the structure with a thickened epoxy layer added to the pattern of FIG. 3.
Figure 5:
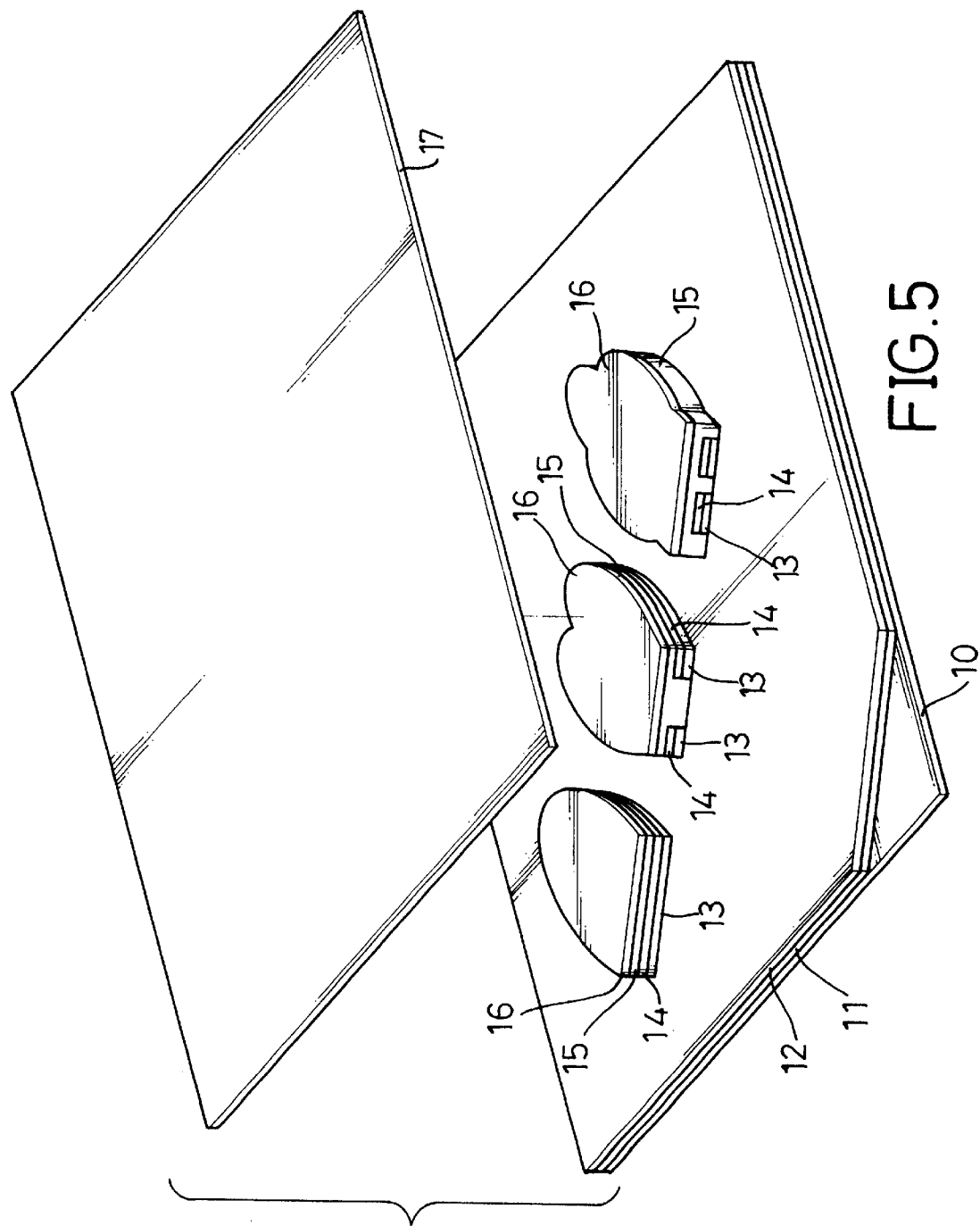
FIG. 5 is a perspective view of a releasing layer added to the outside of the thickened epoxy layer of FIG. 4.
Figure 6:
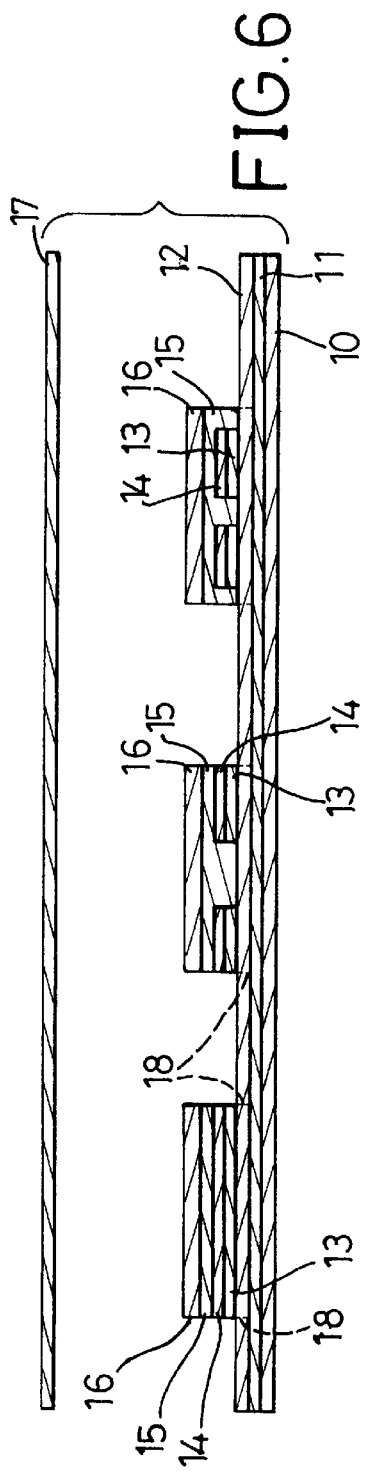
FIG. 6 is a cross sectional view of the sticker along the line 5—5 of FIG. 4.

With reference to FIG. 1, the cutting-free method for making a hologram sticker in accordance with the present invention comprises the steps of:

a. Applying a First Releasing Layer onto a Base;

With reference to FIG. 2, a first releasing layer (11) is applied on top of a base (10).

b. Applying an Epoxy Layer onto the First Releasing Layer;

The epoxy layer (12) is a transparent layer or in an alternate embodiment, the epoxy layer (12) carries colors.

c. Plating a Metal Layer on the Epoxy Layer;

With reference to FIG. 2, a plating step is carried out on the epoxy layer (12) in a vacuum to form a plated metal layer (13) on the epoxy layer (12). In the preferred embodiment of the invention, the plated metal layer (13) is a layer of metal powder. Because the metal layer (13) is plated on top of the epoxy layer (12), the hologram is to be formed on the metal layer (13).

d. Epoxy Printing;

With reference to FIG. 2, a protective epoxy layer (14) in the desired pattern of the hologram is printed on the top of the plated metal layer (13) to form a protective layer onto the plated metal layer (13).

e. Etching;

With reference to FIG. 3, an alkaline solution is used to chemically etch areas where there is no epoxy covered. Because the protective epoxy layer (14) is resistant to the alkaline solution and the protective epoxy layer (14) is applied in a predetermined pattern, areas with no protective epoxy layer (14) will be etched away by the alkaline solution. Therefore, only the plated metal layer (13) covered by the protective epoxy layer (14) is not etched away.

f. Washing;

Clean water is used to wash away the alkaline solution residue. Alternatively, an acid solution is applied first to neutralize the alkaline solution, then water is used to remove the chemical etching residue.

f. Drying;

After washing, the semi-product is dried by using forced air, such as a blower, or a suitable heat source, such as heat lamps.

g. Applying a Thickened Epoxy Layer and an Adhesive Layer to the Protective Epoxy Layer (14);

With reference to FIG. 4, at least one thickened epoxy layer (15) is applied on the protective epoxy layer (14) to enhance the three dimensional feature of the protective epoxy layer (14). Then, a layer of adhesive layer (16) is covered outside the thickened epoxy layer (15).

h. Applying a Second Releasing Layer;

With reference to FIGS. 5 and 6, a second releasing layer (17) is added on top of the adhesive layer (16) to complete the production of the sticker.

Figure 7:
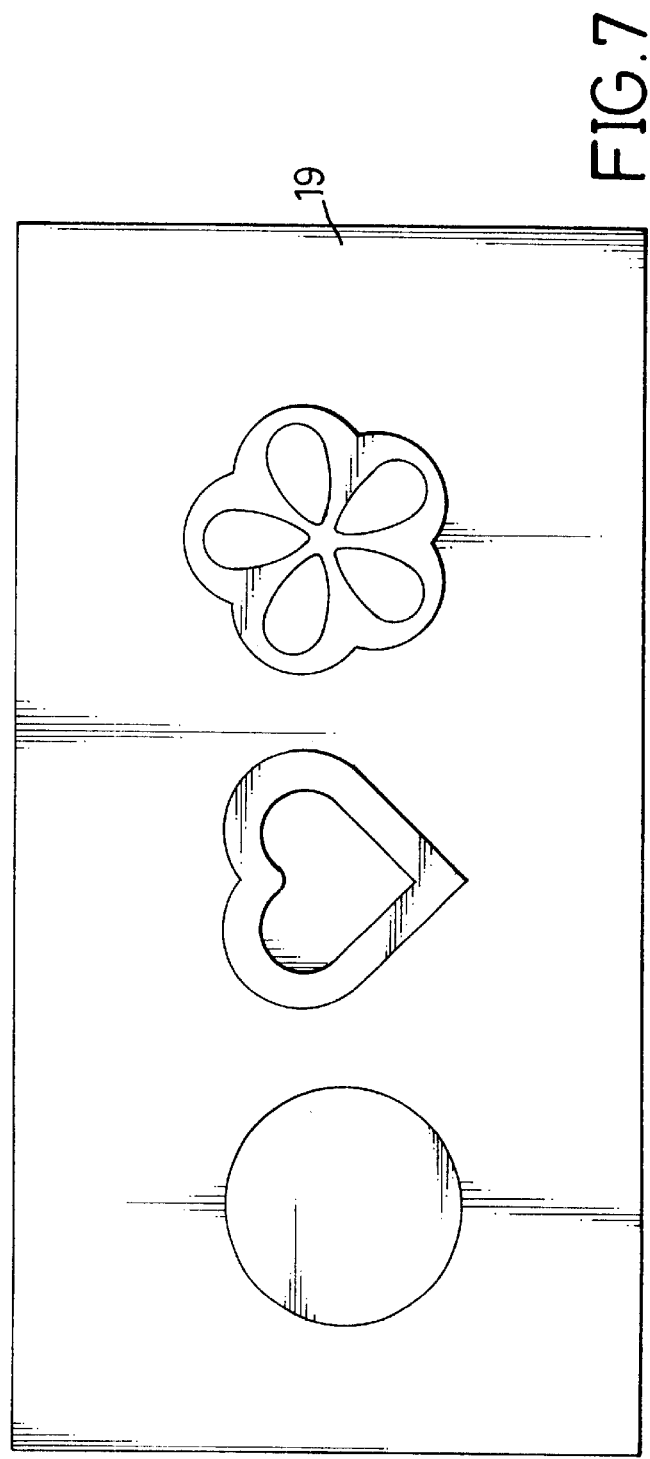
FIG. 7 is a plan view of the finished product of the present invention.
Figure 8:
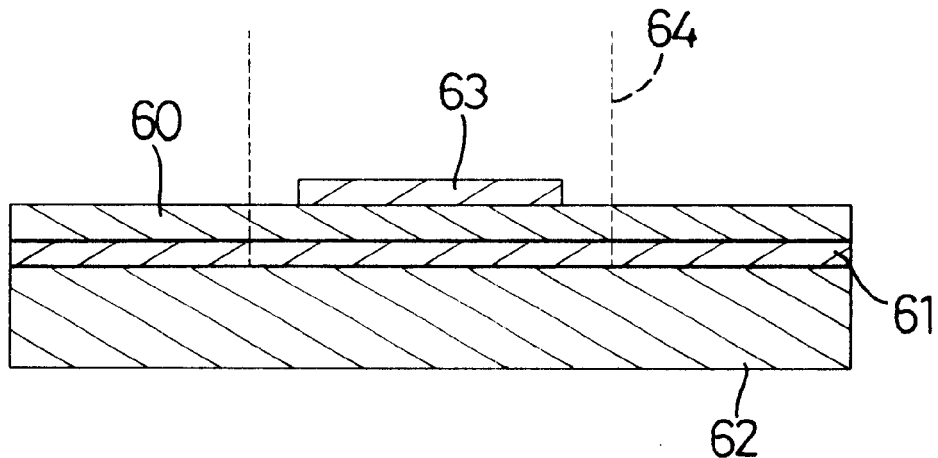
FIG. 8 is a cross sectional side plan view of a conventional sticker in accordance with the prior art.
Figure 9:
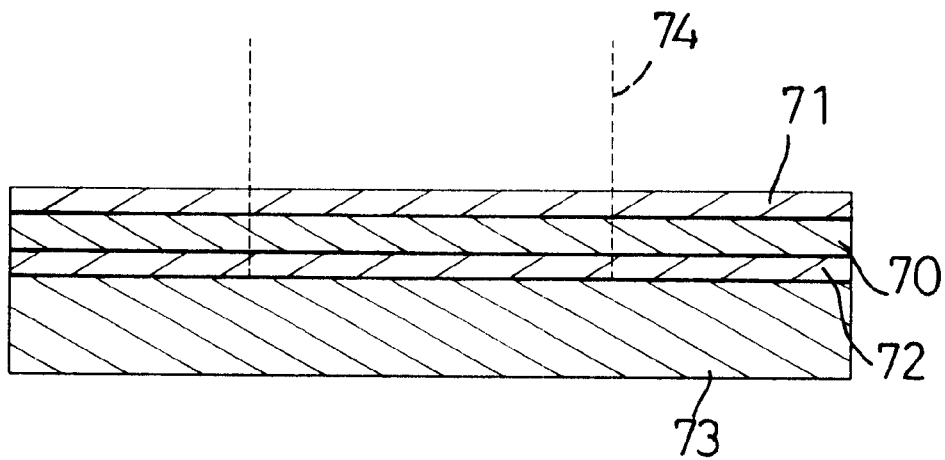
FIG. 9 is a cross sectional side plan view of another embodiment of a conventional sticker in accordance with the prior art.
Figure 10:
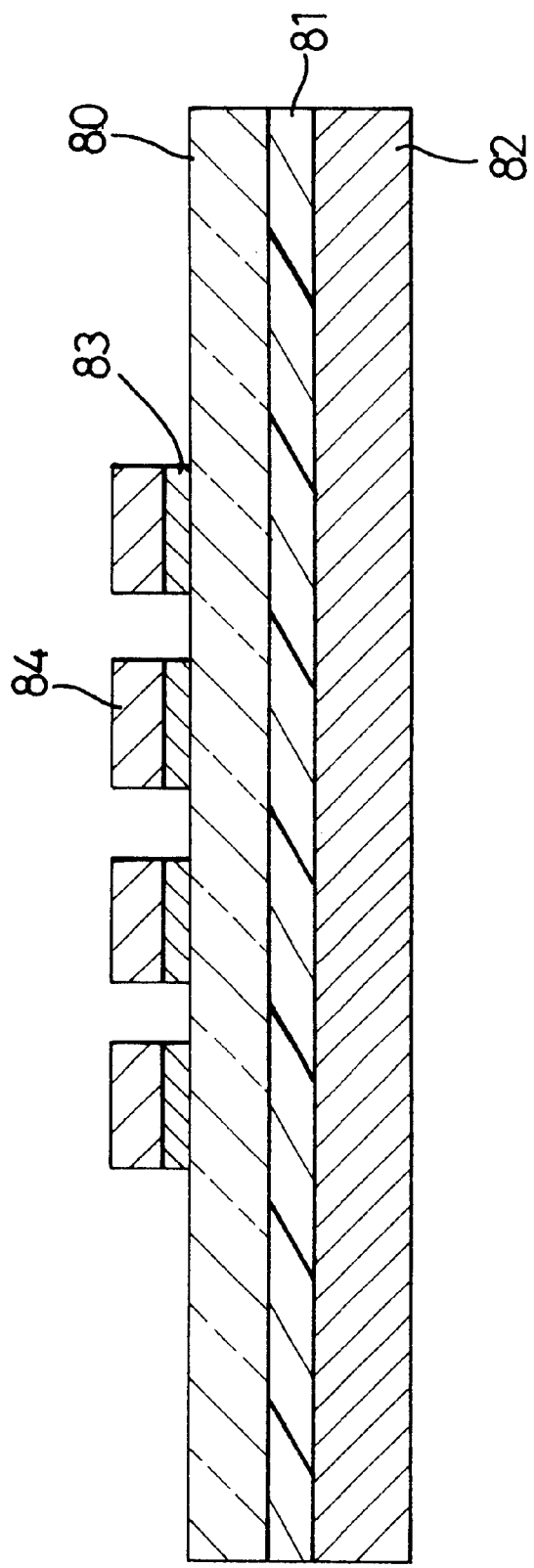
FIG. 10 is a cross sectional side plan view of still another embodiment of a conventional sticker in accordance with the prior art.

With the steps as described, after the production of the sticker, the outline of the sticker perfectly matches the contour of the pattern predetermined by the protective epoxy layer (14), such that the manufacturer will not need to cut along the sticker contour as is conventionally required. Thus, when the sticker is used, a perfect edge of the pattern is presented, as shown in FIG. 7.

It is noted that when the sticker in accordance with the present invention is used and after the second releasing layer (17) is removed, because the adhesion between the adhesive layer (16) and the surface to be attached by the sticker is stronger than that of the first releasing layer (11) between the base (10) and the epoxy layer (12), the sticker of the invention is easily broken from broken lines (18) on the epoxy layer (12) to be separate from the base (10) and the first releasing layer (11).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A cutting-free method for making a hologram sticker comprising the steps of:
    a. applying a first releasing layer onto a base;
    b. applying an epoxy layer onto the first releasing layer;
    c. plating a metal layer on the epoxy layer;
    d. epoxy printing to form a protective epoxy layer;
    e. etching the protective epoxy layer;
    f. washing the etched protective epoxy layer;
    g. drying the washed protective epoxy layer;
    h. applying a thickened epoxy layer and an adhesive layer to the protective epoxy layer; and
    i. applying a second releasing layer.

2. The method as claimed in claim 1, wherein an alkaline solution is used in the etching step to remove areas of the plated metal layer free of the protective epoxy layer.

3. The method as claimed in claim 1, wherein in the washing step, an acid solution is used to neutralize the alkaline solution used to etch away the plated metal layer.

4. The method as claimed in claim 2, wherein in the epoxy printing step, the epoxy layer is printed in a predetermined pattern.

5. The method as claimed in claim 3, wherein in the epoxy printing step, the epoxy layer is printed in a predetermined pattern.

6. The method as claimed in claim 1, wherein a neutralization step is added before the washing step.

7. The method as claimed in claim 6, wherein an alkaline solution is used to etch the protective epoxy layer.

8. The method as claimed in claim 7, wherein an acid solution is used for neutralization step.

9. The method as claimed in claim 1, wherein the plating step is undergone in vacuum.

10. The method as claimed in claim 9, wherein an alkaline solution is used in the etching step to remove areas of the plated metal layer free of the protective epoxy layer.

11. The method as claimed in claim 10, wherein in the washing step, an acid solution is used to neutralize the alkaline solution used to etch away the plated metal layer.

12. The method as claimed in claim 10, wherein in the epoxy printing step, the epoxy layer is printed in a predetermined pattern.

13. The method as claimed in claim 11, wherein in the epoxy printing step, the epoxy layer is printed in a predetermined pattern.

14. The method as claimed in claim 9, wherein a neutralization step is added before the washing step.

15. The method as claimed in claim 14, wherein an alkaline solution is used to etch the protective epoxy layer.

16. The method as claimed in claim 15, wherein an acid solution is used for neutralization step.

* * * * *